United States Patent [19]
Hall, III

[11] Patent Number: 5,509,865
[45] Date of Patent: Apr. 23, 1996

[54] PLANET GEAR ASSEMBLY WITH A PLANETARY CARRIER

[75] Inventor: Arthur Hall, III, Cicero, Ind.

[73] Assignee: General Motors Corporation, Detroit, Mich.

[21] Appl. No.: 355,573

[22] Filed: Dec. 14, 1994

[51] Int. Cl.$^6$ .................................................. F16H 57/08
[52] U.S. Cl. .......................... 475/340; 475/331; 475/338; 475/269
[58] Field of Search ...................................... 475/331, 338, 475/339, 340, 346, 269, 282, 283, 288

[56] References Cited

U.S. PATENT DOCUMENTS

| | | | |
|---|---|---|---|
| 1,964,730 | 7/1934 | Harris | 475/338 X |
| 3,527,121 | 9/1970 | Moore | 475/338 |
| 3,939,736 | 2/1976 | Morim | 475/338 |
| 4,201,098 | 5/1980 | Harvey | 475/282 X |
| 4,391,163 | 7/1983 | Beuthake et al. | 475/346 X |
| 5,267,916 | 12/1993 | Beim et al. | 475/285 |
| 5,292,292 | 3/1994 | Heinrich et al. | 475/331 |
| 5,326,334 | 7/1994 | Ra et al. | 475/330 |

*Primary Examiner*—Charles A. Marmor
*Assistant Examiner*—Peter Kwon
*Attorney, Agent, or Firm*—Donald F. Scherer

[57] ABSTRACT

A planet carrier for a compound planetary gear arrangement has four side plates supporting six pinion gears. One pair of side plates, supporting three of the pinion gears, have one of the other pair of side plates disposed axially between them. This allows the pinions to be in meshing relation between adjacent side plates which are each supporting three pinions, respectively. To complete the planetary arrangement, the outer side plates are sized to permit central access at respective sun gears and outer axial access at respective ring gears. The ring gears and sun gears do not encroach upon the meshing location of the pinion gears. With the judicious use of friction clutches and brakes and two input gear sets providing ratios, the compound planetary arrangement can be controlled to provide powertrains having from five forward speeds (the four friction devices) to seven forward speeds and two reverse speeds (with eight friction devices). Thus, the planetary arrangement can be utilized to provide a plurality of speed ratios, wherein the number of friction devices is one less than the total number of speed ratios.

9 Claims, 7 Drawing Sheets

PLANET GEAR ASSEMBLY WITH A PLANETARY CARRIER

TECHNICAL FIELD

This invention relates to planetary powertrains, and more particularly, to the planetary gear arrangements and carrier structure of the powertrain.

Specifically, this invention relates to the carrier assembly of the planet gear arrangement.

BACKGROUND OF THE INVENTION

Pol Ravigneaux was the inventor of a multitude of gearing arrangements. In many of these arrangements, which today bear his name, a pair of sun gears and a pair of ring gears are utilized with two sets of intermeshing planet gears disposed in a common carrier. The planetary gear members are sized such that a long pinion and short pinion are utilized. The long pinion extends from meshing with a respective sun and/or ring gear to mesh with the short pinion which, in turn, meshes with a sun and/or ring gear. The Ravigneaux gear sets have been utilized with one sun gear, two ring gears and the meshing pinions, or two sun gears with meshing pinions and one ring gear, and various combinations of the ring gear/sun gear elements.

Generally, the extended pinion gear is disposed radially between the opposite sun and ring gears, since it must mesh with the short pinion. The extended portion of this ring gear must be sized diameterwise to avoid contact with both the sun gear and ring which mesh with the short pinion. They must also avoid contact with any other planet pinions which might be disposed within the gear arrangement. This restricts the allowable gear sizes and ratios that might be otherwise used with the Ravigneaux gear set.

Another restriction to the gear size and overall gear ratios, is the requirement of carrier stiffness. The carrier must provide side plates and pinion pins which will be sufficiently stiff to support the loads imposed thereon by the pinion gears during torque transmission between the input and output members of the gear set.

In Ravigneaux gear sets, the end faces, side plates or cheeks of the carrier, are joined by the pinion pins which are secured therebetween. The cross-sectional area of the pinion pins is limited to the available space between the side plates which is not occupied by the planet gears. Since the Ravigneaux carrier has to enclose two sets of planet gears, the space available for posts is limited and the carrier stiffness is, as a result, also limited.

SUMMARY OF THE INVENTION

The carrier constructed in accordance with the present invention, utilizes four plates instead of two. Each pair of plates supports a set of pinion gears. The side plates or cheeks are spaced such that one of each pair of side plates is disposed intermediate the other pair. This provides a meshing area or location for the planet pinions which is removed from the radial space between the sun gear and ring gear combinations which also must mesh with the respective planet sets. Since neither of the extended planet sets extend into the opposing sun and ring gear meshing areas, the size of the extended planets is not limited. This allows the selection of planet size to be a function of the desired gear ratio with no consideration given to the interference with the ring and sun gears.

Also, the offset side plates of the planet sets allows for three sets of shorter pinion pins instead of one set of long pins. One set of pinion pins is located between one pair of side plates, while the other set of posts is located or disposed between the other set of side plates. This allows for the maximum pinion pin size to be utilized while shortening the overall length of the individual pinion pins. Thus, this arrangement will provide a maximum amount of stiffness.

It is therefore an object of this invention to provide an improved planetary powertrain having a planet carrier assembly with multiple side plates disposed in pairs to support a plurality of intermeshing pinion gears.

It is another object of this invention to provide an improved planet carrier having a high stiffness value for a planet gear arrangement, wherein four side plates are interconnected in pairs by the support pins of the pinion gears.

It is a further object of this invention to provide an improved planet carrier assembly having high stiffness values for a planetary gear arrangement, wherein four side plates are interconnected by the pinion pins in pairs, and wherein one side plate of each pair of side plates is arranged intermediate the other pair of side plates.

DESCRIPTION OF AN EXEMPLARY EMBODIMENT

Figure 2:
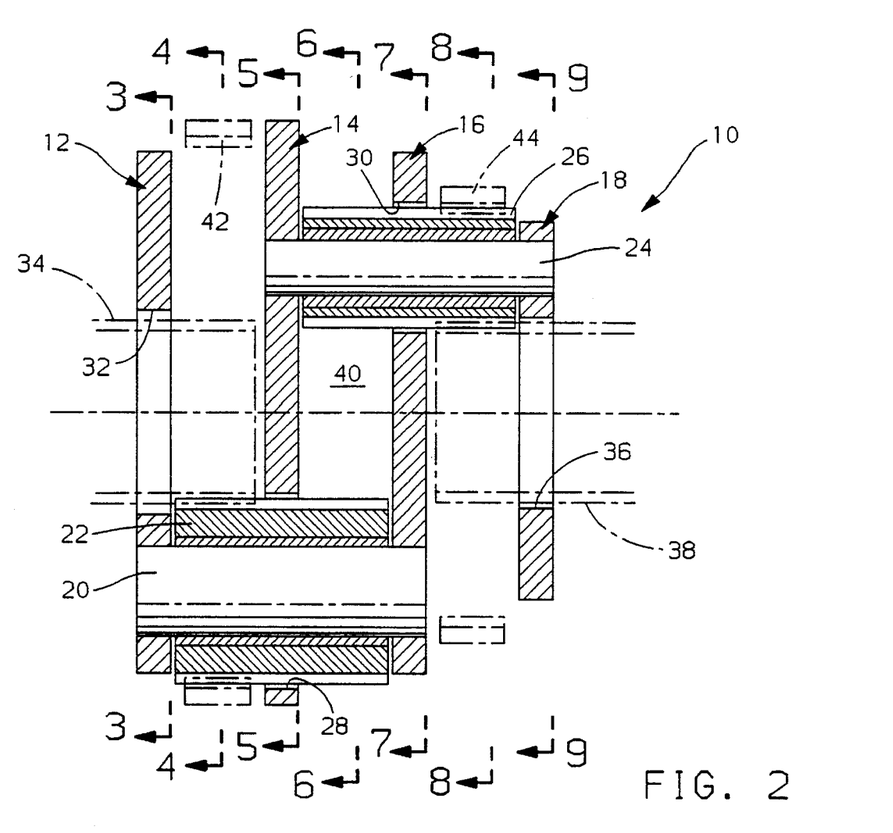
FIG. 2 is a cross-sectional elevational view of a planet carrier assembly incorporating the present invention.

As seen in FIG. 2, a planet carrier assembly 10 has four side plates or cheek plates 12, 14, 16 and 18. The side plates 12 and 16 are interconnected by pinion pins 20 which rotatably support pinion gears 22. The side plates 14 and 18 are interconnected by pinion pins 24 which rotatably support pinion gears 26. The side plate 14 is disposed intermediate side plates 12 and 16, while the side plate 16 is interposed intermediate the side plates 14 and 18. The side plate 14 has a plurality of openings 28 through which the pinion gears 22 extend and the side plate 16 has openings 30 through which the pinion gears 26 extend.

The side plate 12 has an opening 32 which admits access for a sun gear 34, shown in phantom line. The side plate 18 has a central opening 36 which admits ingress of a sun gear 38, shown in phantom line. The sun gear 34 meshes with the pinion gears 22 and the sun gear 38 meshes with the pinion gears 26. The pinion gears 22 and 26 intermesh in a central space 40 disposed between the side plates 14 and 16. The pinion gears 22 are also disposed in meshing relationship with a ring gear 42, which is shown in phantom line, and the pinion gears 26 are in meshing relationship with a ring gear 44, shown in phantom line.

Figure 1:
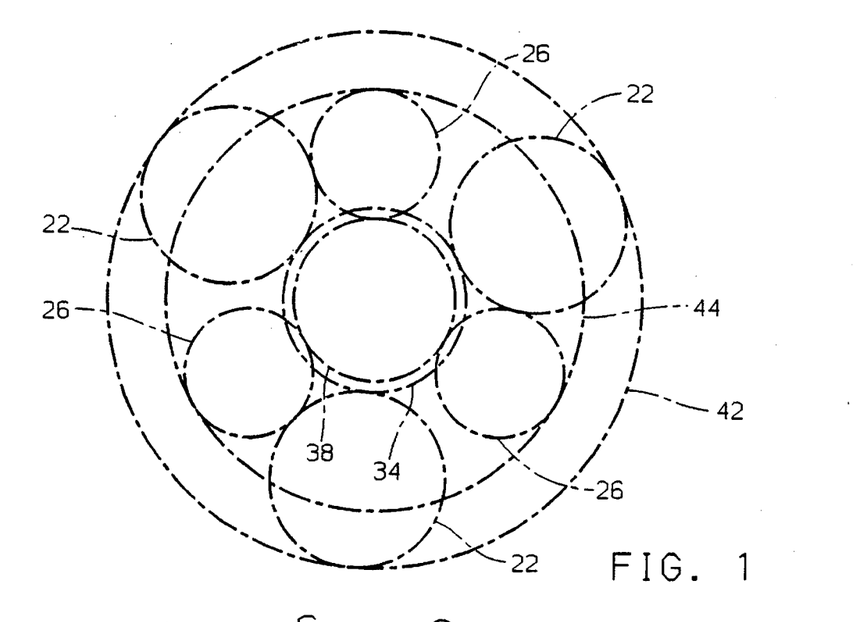
FIG. 1 a schematic representation showing the layout of the meshing circles of the various gears involved in the present invention.

The sun gears 38 and 34 and the ring gears 42 and 44 do not encroach upon the space 40 where the meshing between the pinion gears 22 and 26 occurs. Thus, the diameter of the pinion gears 22 does not affect the size of sun gear 38 or ring gear 44, and likewise, the diameter of pinions 26 does not affect the diameter of sun gear 34 and ring gear 42. The intermeshing relationship of the gears can be seen in the meshing circles of the respective gears shown in FIG. 1.

Figure 3:
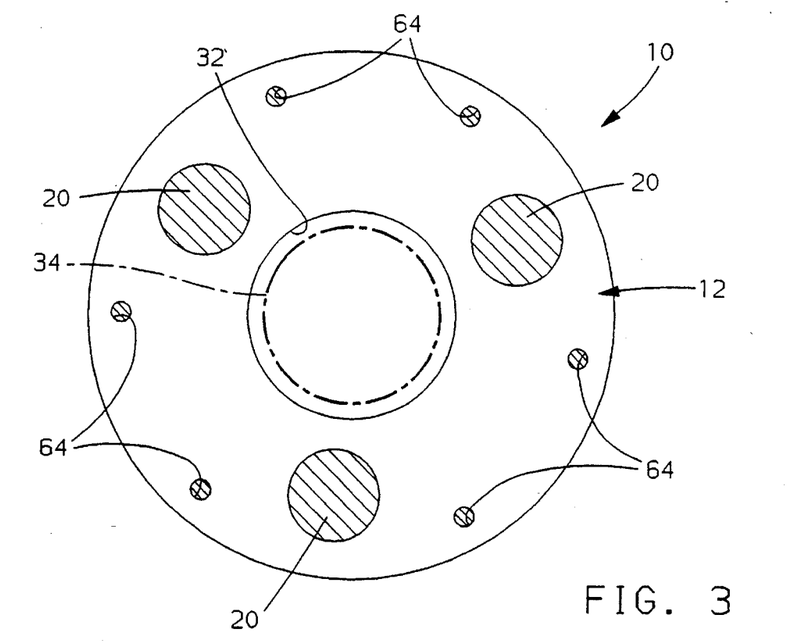
FIGS. 3 through 9 are sectional views taken along lines 3—3 through 9—9 of FIG. 2.
Figure 4:
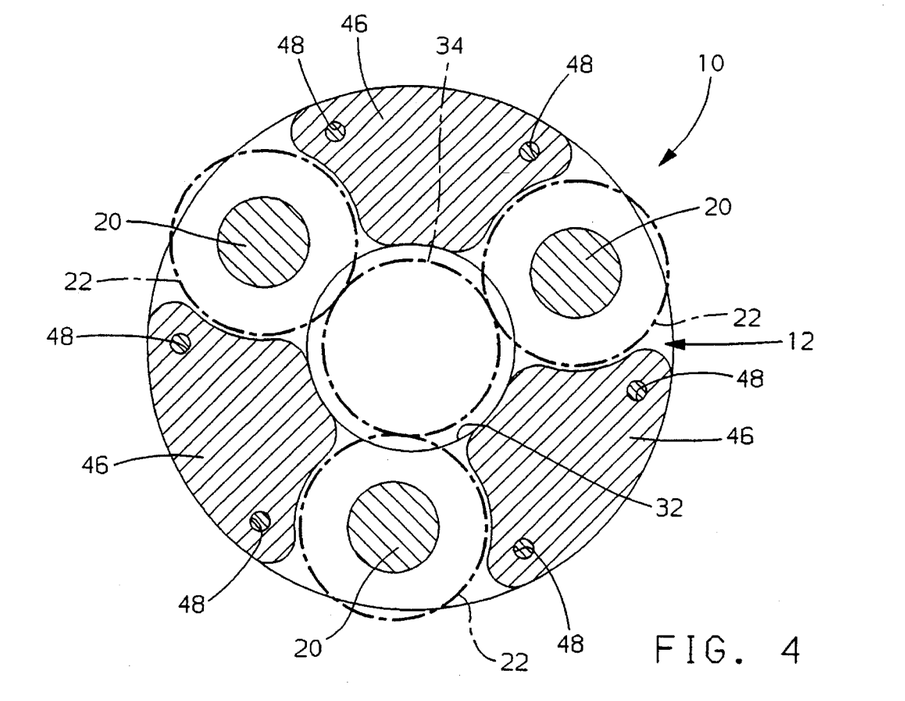
Figure 5:
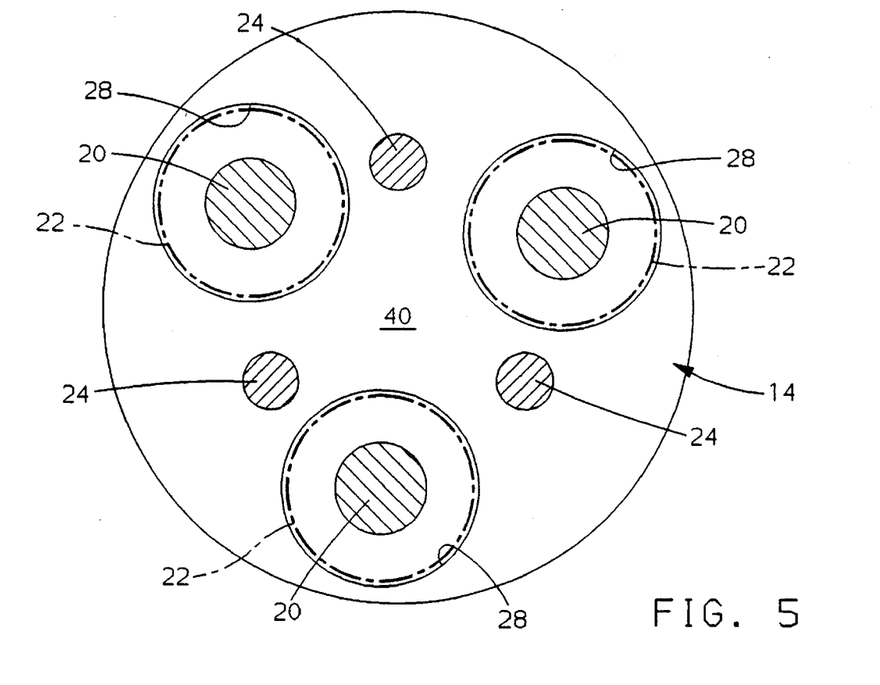

FIG. 3 is an elevational view of side plate 12 showing the central opening 32 and the pinion pins 20. The side plates 12 and 14 are interconnected by spacer members 46, as shown in FIG. 4. These spacers 46 are sized to allow the pinion gears 22 to pass therebetween. These spacers 46 increase the stiffness of the carrier and are provided with bolt holes or apertures 48 which permit the interconnecting of plates 12 and 14. The plate 14, as best seen in FIG. 5, has secured thereto the pins 24 and the openings 28 which permit the pinion gears 22 and pins 20 to pass through the plate 14. The plate 14 preferably has the spacers 46 cast integrally therewith.

Figure 6:
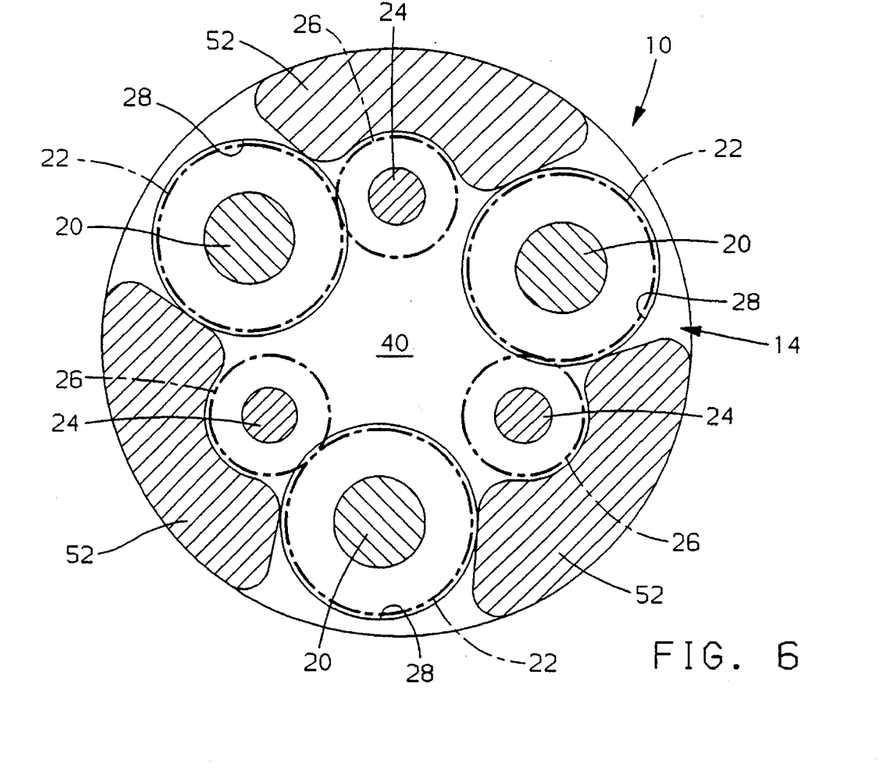

As best seen in FIG. 6, a plurality of spacers 52 are disposed between the plate 16 and the plate 14 to provide stiffness between these two plates. The spacers 52 are sized to permit passage of the pinion gears 22 and clearance for the pinion gears 26. In the preferred embodiment, the plates 14, 16 and spacers 52 and 46 are integrally cast in a single member.

Figure 7:
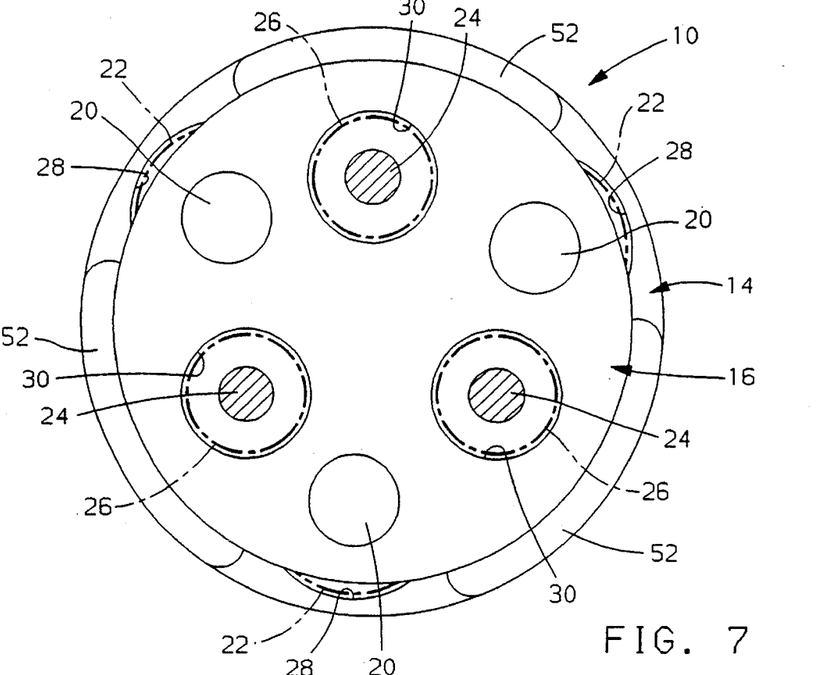

As seen in FIG. 7, the side plate 16 has secured therein the pins 20 and includes apertures 54 to permit the through passage of the pinion gears 26 and their supporting pins 24.

Figure 8:
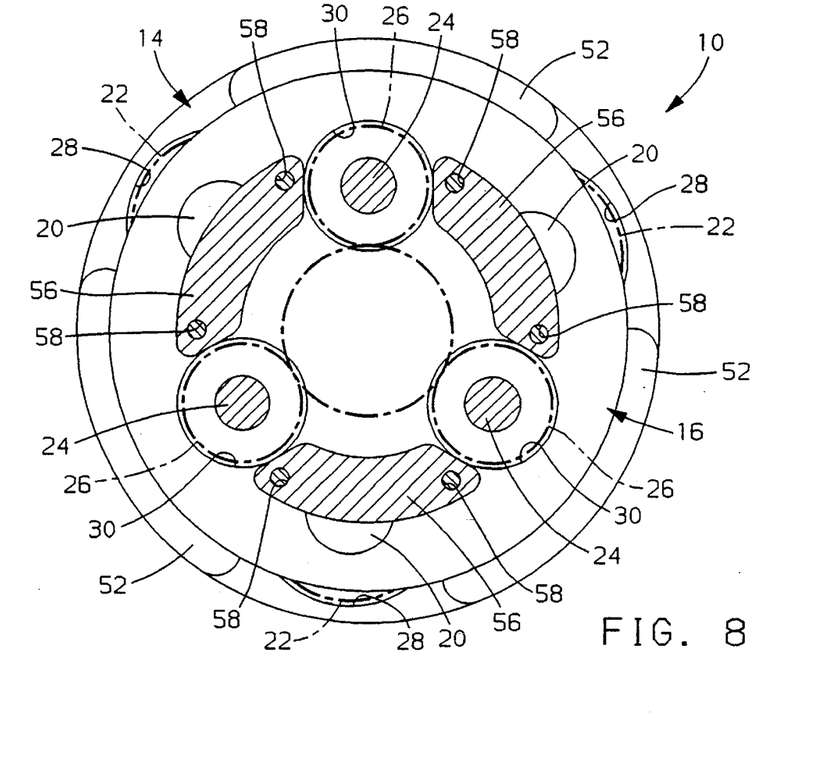

As seen in FIG. 8, the side plate 16 has integrally cast therewith a plurality of spacers 56 which are adapted to provide rigidity between the side plate 16 and the side plate 18. The spacers 56 have apertures 58 formed therein to permit fasteners to extend between the side plate 18 and the spacers 56 to provide securement between these components. The side plates 14 and 16, as well as the spacers 46, 52 and 56, are preferably cast as a single component. These members can be cast and then finish machined to provide the apertures 48 and 58 with threaded portions, and also to provide the proper size for the respective pinion pins 20 and 24.

Figure 9:
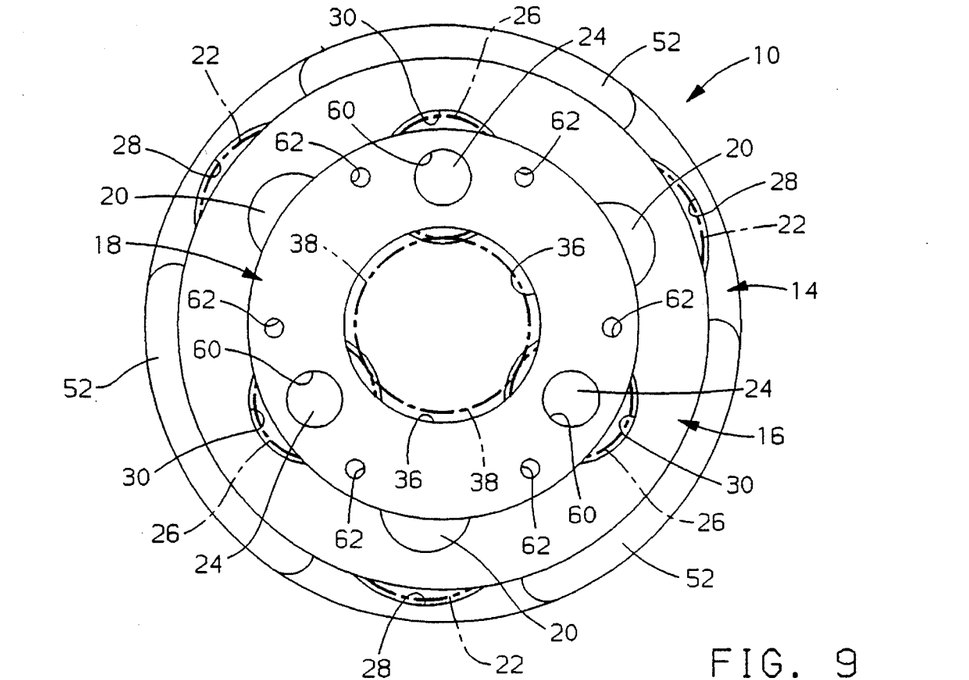

The side plate 18, as best seen in FIG. 9, has apertures 60 which provide openings for securement of the pinion pins 24, and apertures 62 in which threaded fasteners (not shown) can be inserted to provide securement between the side plate 18 and the spacers 56. The side plate 12 includes apertures 64 which permit access of threaded fasteners which extend into the apertures 48 formed in the spacer 46. This permits assembly of the carrier by using twelve threaded fasteners to secure the four side plates into a rigid structure.

Obviously, other manufacturing techniques can be utilized to provide the interconnection of the four side plates. For example, the side plates 12 and 14 can be cast as an integral unit along with the spacers 46 and 52, while the side plates 16 and 18 can be cast as an integral unit along with the spacers 56. Likewise, the side plates 16 and 18 can be integrally cast with the spacers 56 and the spacers 52 or the spacers 52 can be partially cast on the side plate 14 and side plate 16, such that at assembly, these spacers 52 will be aligned in their proper orientation.

Figure 10:
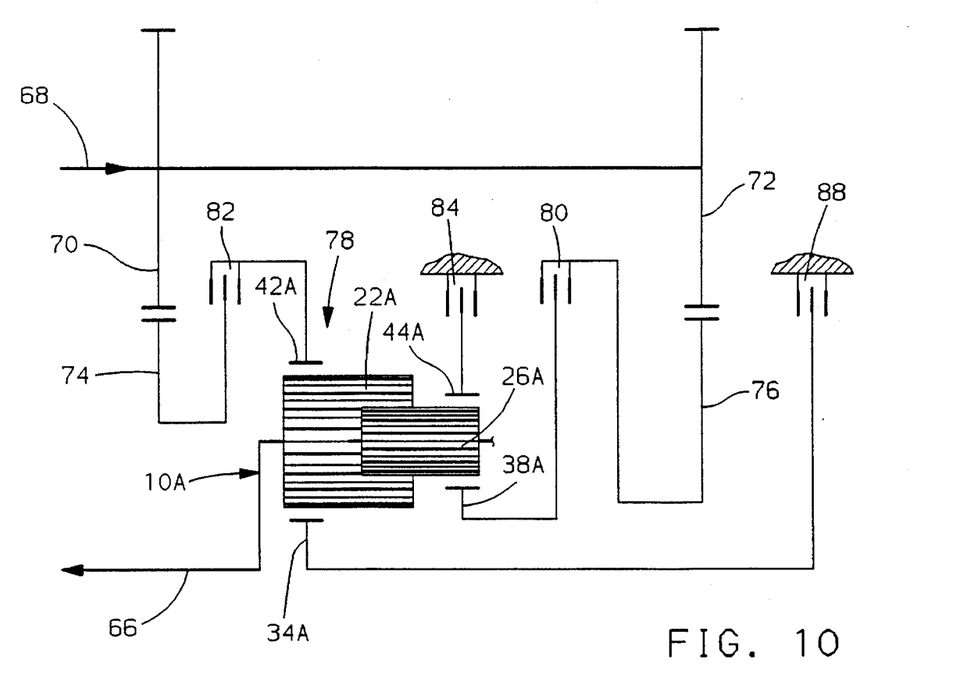
FIG. 10 is a schematic representation of a planetary gear arrangement incorporating the present invention providing five speed ratios within the planetary arrangement.

It should be appreciated that the pinion pins 24 and 20 are extremely short compared to what might need to be utilized if the pinion pins had to extend between the outermost side plates 12 and 18. Also, by permitting the meshing of the pinion gears in the central space 40, the size of the ring gears and sun gears is not affected by the opposite pinion gear size. This arrangement permits the pinion gears 26 and 22 to have a larger or smaller diameter in the meshing or central space 40 than might otherwise be available in a conventional unit. For example, the pinion gear 22, in the space between the space 40, could be made of a smaller diameter while the pinion gear 26 could have a larger diameter thereby retaining the meshing engagement between these pinion gears while affecting the ratios that might otherwise be attainable. In FIG. 10, a schematic representation of the gear assembly depicted in FIG. 2 is shown. The gear elements are designated with the same numeric designation with an added "A" suffix. For example, the sun gear 34 of FIG. 2 is designated 34A in FIG. 10.

The carrier 10A is drivingly connected with an output shaft 66 which is adapted to drive vehicle wheels or track sprockets (not shown). The gearing arrangement of FIG. 10 also includes an input shaft 68 adapted to be driven by an internal combustion engine or other prime mover (not shown). The shaft 68 has drivingly connected therewith a pair of input gears 70 and 72 which mesh with respective gears 74 and 76. The gears 70, 74 provide one input ratio and the gears 72, 76 provide a second input gear ratio to the planetary gearing arrangement 78 constructed in accordance with that shown in FIG. 2.

The gear 76 is operatively connected with the sun gear 38A by a friction torque transmitting assembly, such as a conventional fluid operated friction clutch 80. The gear 74 is operatively connectible with the ring gear 42A through a selectively engageable conventional friction clutch 82. The ring gear 44A is operatively connected with a friction torque transmitting assembly, such as a conventional friction brake 84 and the sun gear 34A is operatively connected with a friction torque transmitting assembly, such as a conventional fluid operated friction brake 88.

The judicious selection of pairs of the clutches and brakes is operable to provide five gear ratios between the input shaft 68 and the output shaft 66. The first and lowest of the gear ratios is established by the selective engagement of clutch 80 and brake 84. The second forward ratio is provided by the selective engagement of clutch 80 and brake 88. The third ratio is provided by the selective engagement of clutch 82 and brake 84. The fourth ratio is provided by the selective engagement of clutch 82 and brake 88 and the fifth ratio is provided by the selective engagement of both the clutches 80 and 82.

If the sun gear 34A has 37 teeth and the ring gear 42A has 111 teeth, the sun gear 38A has 27 teeth and the ring gear 44A has 81 teeth, the gears 72 and 76 provide a ratio of 1.23 and the gears 70 and 74 provide a ratio of 1.0, the following overall ratios will be attained:

| First Ratio | 4.919 |

| | |
|---|---|
| Second Ratio | 2.915 |
| Third Ratio | 1.730 |
| Fourth Ratio | 1.333 |
| Fifth Ratio | .943 |

As can be seen, the transmission shown in FIG. 10 provides five forward speed ratios utilizing four friction devices.

Figure 11:
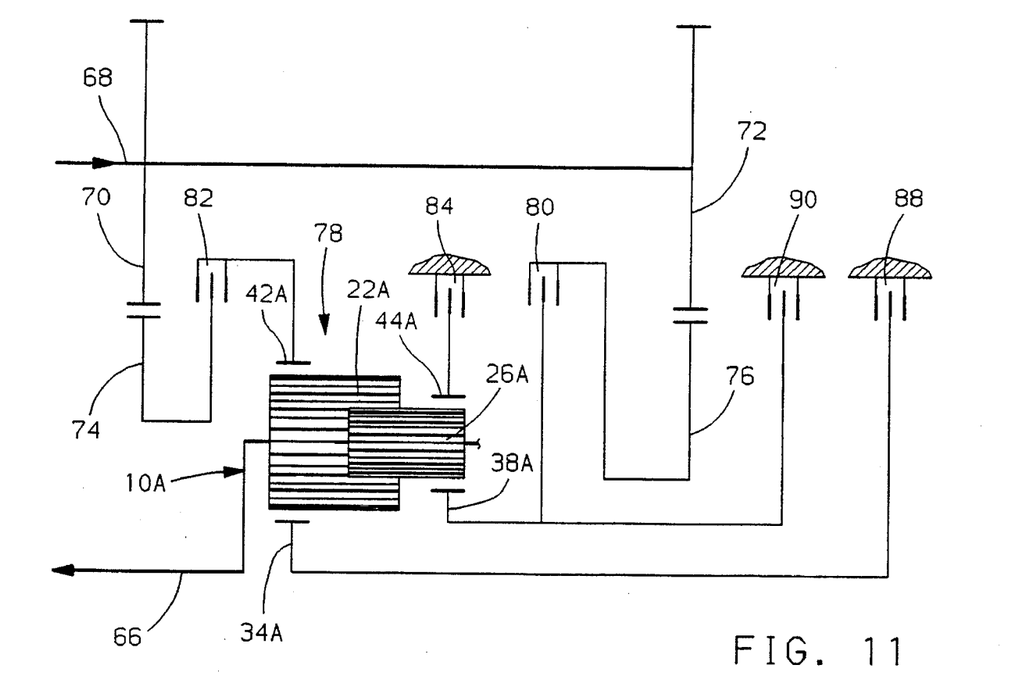
FIG. 11 is a schematic representation similar to FIG. 10, wherein six speed ratios are provided by the planetary gear arrangement.

The transmission shown in FIG. 11 is substantially identical with that shown in FIG. 10 with the addition of a selectively engageable fluid operated brake 90. The addition of the brake 90 permits the selective engagement of clutch 82 and brake 90 to provide a six speed ratio which will establish an overall ratio of 0.757 between the input shaft 68 and the output shaft 66.

Figure 12:
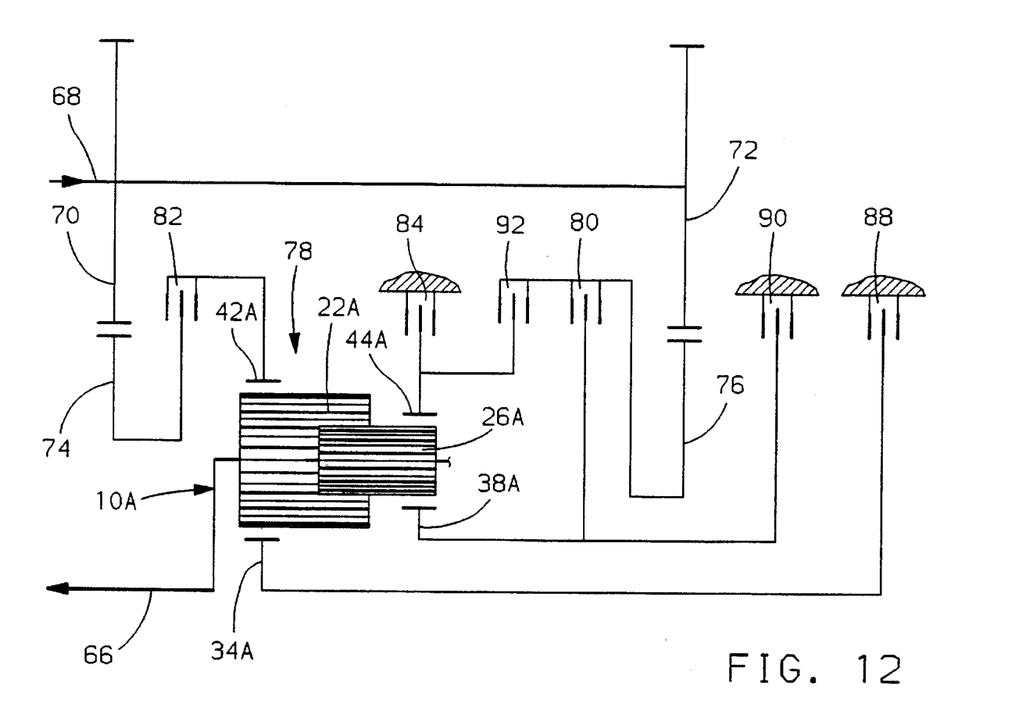
FIG. 12 is a schematic representation similar to FIG. 11, wherein seven speed ratio are provided by the planetary gear arrangement.

The transmission shown in FIG. 12 is substantially the same as that shown in FIG. 11 with the addition of a selectively engageable friction clutch 92 which is operatively connected with the ring gear 44A. Selective engagement of the clutch 92 and brake 88 will provide a seven speed ratio between the input and output shafts 68 and 66, respectively, having an overall value of 0.543.

Figure 13:
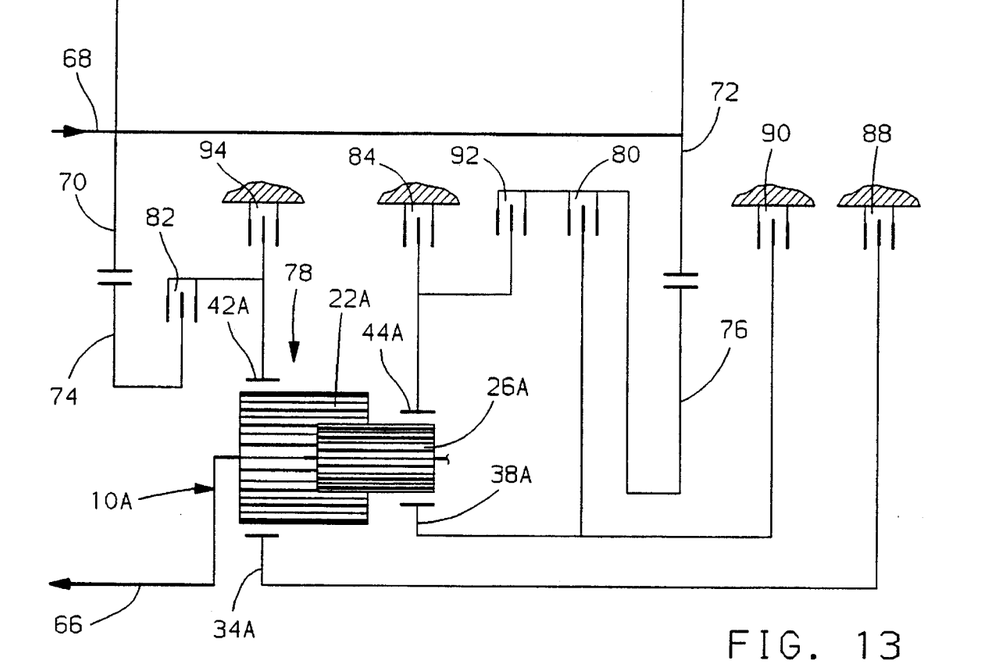
FIG. 13 is a schematic representation similar to FIG. 12, wherein eight speed ratios, including seven forward ratios and one reverse ratio, are provided by the planetary gear arrangement.

The planetary gear arrangement shown in FIG. 13 is substantially the same as that shown in FIG. 12 with the addition of a fluid operated selectively engageable brake 94 operatively connected with the ring gear 42A. The selective actuation of brake 94 and clutch 80 will provide a reverse ratio between the input and output shafts having a negative value of 3.825.

Figure 14:
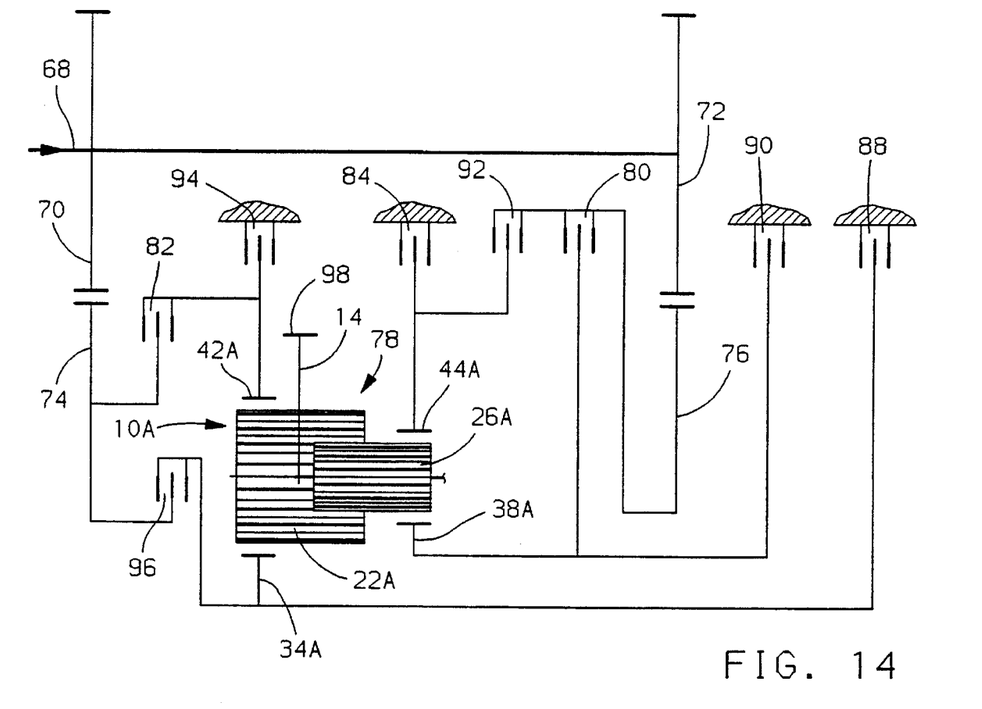
FIG. 14 is a schematic representation similar to FIG. 13, wherein the planetary gear arrangement incorporating the present invention is constructed to provide seven forward ratios and two reverse ratios.

The transmission arrangement shown in FIG. 14 is substantially the same as that shown in FIG. 13 with the addition of a selectively engageable fluid operated clutch 96 operatively engageable between the gear and the sun gear 34A. The selective engagement of clutch 96 and brake 84 will provide another reverse ratio between in the input shaft 68 and an output gear or sprocket 98 connected with the carrier 10 having a negative value of 1.189. The gear or sprocket 98 can be connected to the two most central plates 14 and 16 of the carrier 10.

It should be pointed out that the addition of clutch 92 in FIG. 12 also permits a further forward gear ratio with the judicious selection of clutch 92 and brake 90. The selection of these units will provide an overall ratio of 1.64 between the input shaft 68 and the output shaft 66. This ratio would fit between the third and fourth ratios provided by the other gear sets.

It should also be evident to those skilled in the art that the addition of the brake 94, which operates on the ring gear 42A, to the transmissions represented by FIGS. 10, 11 and 12, will also provide the reverse ratio with the judicious selection of clutch 80 and brake 94.

Likewise, the addition of clutch 96 to any of the FIGS. 10 through 13 will also provide the reverse ratio, such as established by the engagement of the clutch 96 and brake 80. Thus, the transmission of FIG. 10 can, with the addition of brake 94, be provided with five forward speed ratios and one reverse ratio. It is also possible to provide a reversing gear set on the input shaft 68 such that all five ratios may be utilized in either forward or reverse.

What is important, and what should be apparent to the persons familiar with the transmission art, is the fact that four friction devices provide five gear ratios in FIG. 10. Likewise, in the remaining FIGS. 11 through 14, there is always one more gear ratio than the number of friction devices.

The embodiments of the invention in which an exclusive property or privilege is claimed are defined as follows:

1. A power transmission comprising:

an input shaft;

an output shaft; and gear means for interconnecting the input shaft and the output shaft through a plurality of selectively actuated gear ratios, said gear means including a planetary gear assembly comprising, a planet carrier assembly having two sets of pinion gears disposed in intermeshing relation with one set of pinion gears rotatably disposed on a first set of support members secured in spaced first and second side plates, the other set of pinion gears being rotatably disposed on a second set of support members secured in third and fourth side plates, said third side plate being disposed axially between said first and second side plates and having openings formed therein to provide clearance for said one set of pinion gears, said second side plate being disposed between said third and fourth side plates and having openings formed therein to provide clearance for said other set of pinion gears, and said one set of pinion gears meshing with said other set of pinion gears only in a space between said second and third side plates; and means for connecting the side plates with the output shaft.

2. The power transmission defined in claim 1 further comprising:

said planetary gear assembly further comprising;

a first sun gear meshing with said one set of pinion gears, a first ring gear meshing with said one set of pinion gears, a second sun gear meshing with said other set of pinion gears, a second ring gear meshing with said other set of pinion gears, said gear means further comprising first and second input ratio gear sets;

clutch means for selectively operatively connecting each of said ratio gear set and the planetary gear assembly; and brake means for selectively connecting at least two of the gears of the planetary gear assembly to a stationary component, said clutch means and brake means being selectively operable to establish a plurality of speed ratios between said input shaft and said output shaft, the number of speed ratios being at least one greater than the total number of clutch means and brake means.

3. The power transmission defined in claim 2, wherein:

a first of the clutch means is operatively connected between the first input ratio gear set and the first ring gear, a second of the clutch means is operatively connected between the second ratio gear set and the second sun gear, a first of the brake means is operatively connected with the first sun gear, and a second of the brake means is operatively connected with the second ring gear.

4. The power transmission defined in claim 3, wherein:

a third of the brake means is operatively connected with one of the second sun gear and first ring gear.

5. The power transmission defined in claim 4, wherein:

a fourth brake means is operatively connected with the other of the second sun gear and first ring gear.

6. The power transmission defined in claim 3, wherein:
a third clutch means is selectively connected between one of the input ratio gear and one of the first sun gear and the second ring gear.

7. The power transmission defined in claim 6, wherein:
a fourth clutch means is selectively connected between the other of the input ratio gear sets and the other of the first sun gear and the second ring gear.

8. A power transmission comprising:

an input shaft;

an output shaft; and gear means for interconnecting the input shaft and the output shaft through a plurality of selectively actuated gear ratios, said gear means comprising,
- a planet carrier assembly having two sets of pinion gears disposed in intermeshing relation with one set of pinion gears rotatably disposed on a first set of support members secured in spaced first and second side plates, the other set of pinion gears being rotatably disposed on a second set of support members secured in third and fourth side plates, said third side plate being disposed axially between said first and second side plates and having openings formed therein to provide clearance for said one set of pinion gears, said second side plate being disposed between said third and fourth side plates and having openings formed therein to provide clearance for said other set of pinion gears, and two of said side plates being formed as an integral structure;
- an opening in said first side plate providing ingress for a first sun gear meshing with the one set of pinion gears;
- an opening in said fourth side plate providing ingress for a second sun gear meshing with said other set of pinon gears;
- first and second ring gears disposed radially between said first and third and second and fourth side plates respectively in meshing engagement with said one set and said other set of pinion gears respectively;
- a plurality of selectively engageable friction torque transmitting means operatively connected with the sun and ring gears for establishing the plurality of gear ratios; and means for connecting the planet carrier with the output shaft.

9. A power transmission comprising:

an input shaft;

an output shaft; and gear means for interconnecting the input shaft and the output shaft through a plurality of selectively actuated gear ratios, said gear means comprising,
- a planet carrier assembly having two sets of pinion gears disposed in intermeshing relation with one set of pinion gears rotatably disposed on a first set of support members secured in spaced first and second side plates, the other set of pinion gears being rotatably disposed on a second set of support members secured in third and fourth side plates, said third side plate being disposed axially between said first and second side plates and having openings formed therein to provide clearance for said one set of pinion gears, said second side plate being disposed between said third and fourth side plates and having openings formed therein to provide clearance for said other set of pinion gears, and two of said side plates being formed as an integral structure.

* * * * *